April 5, 1927.
J. J. W. KENAN
1,623,056
ACIDPROOF VALVE
Filed Aug. 2, 1923
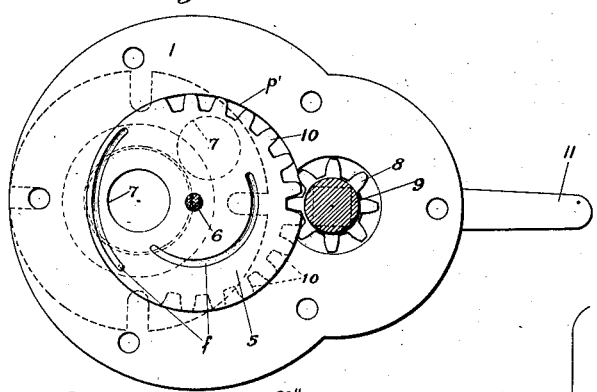
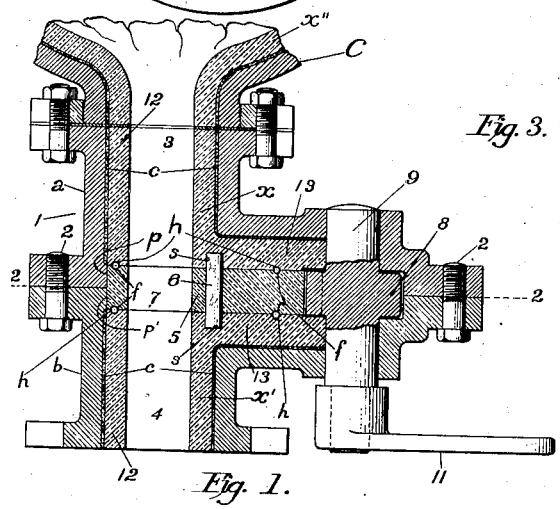
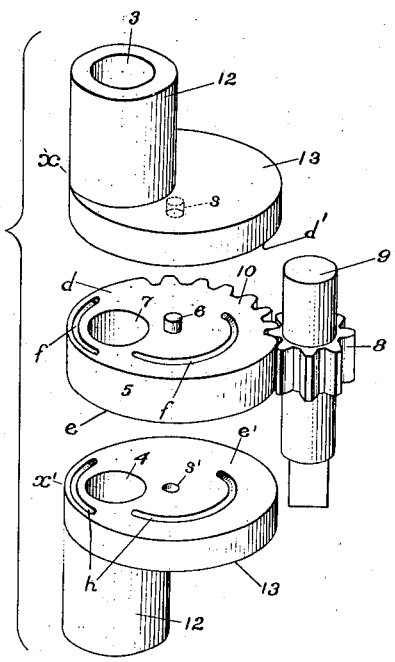
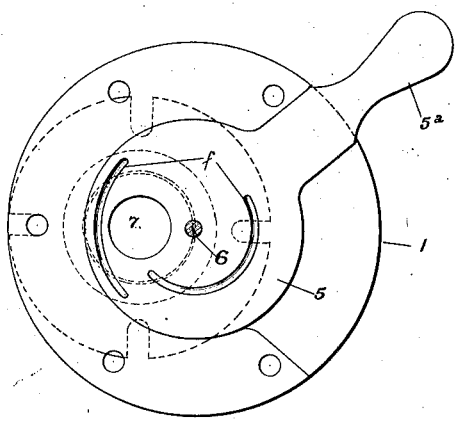
Inventor
John J. W. Kenan
By Attorney
Albert F. Nathan Patented Apr. 5, 1927.

1,623,056

UNITED STATES PATENT OFFICE.

JOHN J. W. KENAN, OF ORANGE, NEW JERSEY.

ACID-PROOF VALVE.

Application filed August 2, 1923. Serial No. 655,332.

This invention relates to valves, and more particularly to valves adapted to control the flow of acids and other highly corrosive fluids.

In handling acids and the like, it is essential that the acid be prevented from coming into contact with any metal affected thereby in order to avoid corrosion with its resultant destruction of pipes, valves, etc.

An object of the invention is to provide a valve which will efficiently regulate (or shut-off without any leakage) the flow of fluids, which may be manufactured at a low cost, which is highly durable and easy of manipulation, and which will be corrosion-proof when used to control acid, etc.

A further object of the invention is to provide a simple and efficient means for lubricating the valve gate, which means will be self-acting for a long period of time after the valve has been assembled.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a central vertical section of a valve embodying the present invention as attached to a portion of a suitable container, and showing, in full and dotted lines respectively, the gate in its open and closed positions. Fig. 2 is a horizontal section on the line 2—2 of Fig. 1 showing the gate in elevation.

Fig. 3 is detail perspective views of the acid-proof sections of the valve and the gate for controlling the flow of fluid through the valve, together with the means for rotating the gate. Fig. 4 is a view similar to Fig. 2 but showing an alternate means for actuating the gate.

Referring more particularly to the drawings, the invention is shown embodied in a valve comprising complemental sections $x$ and $x'$ formed of acid-resisting material such as glass. These sections have body-portions formed with eccentrically located passages 3 and 4, respectively, through which the fluid flows when assembled with the passages in alignment. In the form shown, the body portions assume the shape of flat disks 13 having tubular parts 12. The sections $x$ and $x'$ are formed with ground and polished surfaces $d'$ and $e'$.

Means for regulating or completely discontinuing the flow of fluid through the passage 3—4 may advantageously comprise a gate 5, preferably of glass and in the form of a disk, located intermediate the disks 13 and held in close contact with the surfaces $d'$ and $e'$. This disk is provided with a port 7 adapted to be brought into and out of registry with the passages 3 and 4.

The gate 5 is rotatably journaled, concentric with the disks, as by means of a pin 6, also of acid-proof material such as glass held in sockets $s$ and $s'$ formed in the disks 13.

Means for rotating or oscillating the gate 6, to bring its port 7 into and out of registry with the passages 3 and 4 preferably comprises a pinion 8 formed integrally with a pin 9 journaled, at its opposite ends, in bearings formed in a casing later to be described. This pinion meshes with gear teeth 10 in the periphery of the gate 5. Any suitable means such as, for example, a handle 11 may be applied to the pin to rotate the pinion, and thereby turn the gate 5.

To hold the sections $x$ and $x'$ the gate 5, and the pinion 8 in their operative positions they are preferably enclosed within a metal binder or casing 1 formed of complemental flanged sections $a$ and $b$ held together by bolts 2. In operation, the section $a$ may be bolted to a suitable container having an acid resisting lining $x''$ and the section $b$ may be connected with a suitable pipe-line (not shown). The sections $x$ and $x'$ are preferably held within the casing sections $a$ and $b$ by means of acid-resisting cement $c$.

From the foregoing, it will be observed that there has been provided a valve comprising two multiple-part sections wholly enclosing a rotary gate in which all of the parts (which come into contact with the fluid being controlled) are made of non-corrosive material, also that the adjacent and the contacting surfaces $d$, $d'$ and $e$, $e'$ (being a ground finish) are leak-proof and the fluid is thereby prevented from seeping out and corroding the metal casing of the multiple part.

The metal casings *a* and *b* preferably extend beyond the finished surface of the disks 13 a distance one-half the thickness of the gate 5 and thereby form opposed pockets *p*, *p'* within which the periphery of the gate is housed.

Means is provided for lubricating (and sealing against leakage) the surfaces *d*, *d'* and *e*, *e'* comprising grooves *f* cut in the opposite faces *d* and *e* of the gate 5 and grooves *h* cut in the faces *d'* and *e'* of the disks 13. These grooves are filled with a suitable lubricant, when the valve is assembled, and the contacting surfaces of the gate and disks are thereby effectively lubricated for a great period of time without renewing the lubricant.

Fig. 4 shows a modified construction in which the gate 5 is formed with an integral handle 5ª by which the gate may be oscillated about its axis to control the flow of fluid through the valve.

As above described, the present valve is particularly adapted for controlling corrosive fluids and therefore the sections *a* and *b* are provided with an acid-resisting lining and the gate 5 is likewise formed of acid-resisting material but it is obvious that the invention is also adaptable to valves for controlling any fluid.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A valve comprising a body formed of two complemental sections having aligned passages and opposed sockets; a pivot pin held within said sockets; a gate journaled upon said pin and provided with a port adapted to be brought into and out of registry with said aligned passages to control the flow of fluid therethrough; casing means for holding said sections against relative movement without permitting fluid to come into contact with said casing-means; and means for oscillating said gate.

2. An acid proof valve comprising an exterior sectional casing of metal having inlet and outlet connections and including a generally cylindrical chamber eccentrically disposed in respect to the inlet and outlet connections, three flat disks of solid glass having eccentrically disposed ports and disposed in said chamber and arranged in facial contact and of which the outside two are fixed and are provided with tubular parts of glass arranged to completely line the inlet and outlet connections of the casing and of which the middle one is turnable, the contact between said disks and the tubular parts providing the means for opposing leakage, and means for turning the middle disk.

In witness whereof, I hereunto subscribe my name.

JOHN J. W. KENAN.